US012738155B2

(12) United States Patent
Zhang et al.

(10) Patent No.: US 12,738,155 B2
(45) Date of Patent: Sep. 15, 2026

(54) METHOD AND APPARATUS FOR VEHICLE APPLICATION

(71) Applicant: Telefonaktiebolaget LM Ericsson (publ), Stockholm (SE)

(72) Inventors: Fengpei Zhang, Guangzhou (CN); Xinmei Ke, Guangzhou (CN); Yinsheng Chen, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 18/721,888

(22) PCT Filed: Dec. 29, 2021

(86) PCT No.: PCT/CN2021/142497
§ 371 (c)(1),
(2) Date: Jun. 20, 2024

(87) PCT Pub. No.: WO2023/123056
PCT Pub. Date: Jul. 6, 2023

(65) Prior Publication Data
US 2025/0061802 A1 Feb. 20, 2025

(51) Int. Cl.
*G08G 1/01* (2006.01)
*G08G 1/0967* (2006.01)
*G08G 1/16* (2006.01)
*H04W 4/44* (2018.01)

(52) U.S. Cl.
CPC ......... *G08G 1/0141* (2013.01); *G08G 1/0108* (2013.01); *G08G 1/0129* (2013.01); *G08G 1/0145* (2013.01); *G08G 1/096708* (2013.01); *G08G 1/164* (2013.01); *G08G 1/166* (2013.01); *H04W 4/44* (2018.02)

(58) Field of Classification Search
None
See application file for complete search history.

(56) References Cited

U.S. PATENT DOCUMENTS

2016/0210853 A1* 7/2016 Koravadi ............... G06V 20/56
2019/0039618 A1* 2/2019 Mori .................... B60W 30/095
2019/0324451 A1* 10/2019 Obata ............... B60W 60/0059
2020/0025838 A1 1/2020 Werth et al.
(Continued)

FOREIGN PATENT DOCUMENTS

CN 113140111 A 7/2021

OTHER PUBLICATIONS

International Search Report and Written Opinion received for PCT/CN2021/142497 mailed on Jun. 28, 2022.
(Continued)

*Primary Examiner* — Amelia Vorce
(74) *Attorney, Agent, or Firm* — Sonoda & Kobayashi Intellectual Property Law; Sarvajit S. Patil

(57) ABSTRACT

Various embodiments of the present disclosure provide a method for vehicle application. The method which may be performed by a vehicle device comprises: receiving a traffic risk index from a first server. The traffic risk index may indicate a traffic risk based on vehicle-to-everything message data. In accordance with an exemplary embodiment, the method further comprises: determining whether to perform one or more actions, according to the traffic risk index.

17 Claims, 11 Drawing Sheets

(56) References Cited

U.S. PATENT DOCUMENTS

| | | | | |
|---|---|---|---|---|
| 2020/0064142 | A1* | 2/2020 | Choi | G01C 21/3647 |
| 2020/0209871 | A1 | 7/2020 | Xiong et al. | |
| 2020/0394918 | A1* | 12/2020 | Chen | G01C 21/3811 |
| 2021/0009126 | A1* | 1/2021 | Yashiro | B60W 50/082 |
| 2021/0048303 | A1 | 2/2021 | Figueredo de Santana et al. | |
| 2021/0089938 | A1 | 3/2021 | Ariannezhad et al. | |
| 2021/0272452 | A1* | 9/2021 | Zhang | G08G 1/0133 |
| 2021/0387651 | A1* | 12/2021 | Kuroda | B60W 40/105 |
| 2022/0258729 | A1* | 8/2022 | Kim | G08G 1/166 |
| 2022/0274621 | A1* | 9/2022 | Ota | B60K 35/28 |
| 2022/0329994 | A1* | 10/2022 | El Essaili | H04L 67/12 |
| 2023/0188964 | A1* | 6/2023 | Pateromichelakis | H04L 67/34<br>709/218 |

OTHER PUBLICATIONS

ETSI EN 302 637-2 V1.4.1 (Apr. 2019), European Standard, “Intelligent Transport Systems (ITS); Vehicular Communications; Basic Set of Applications; Part 2: Specification of Cooperative Awareness Basic Service”.

ETSI EN 302 637-3 V1.3.1 (Apr. 2019), European Standard, “Intelligent Transport Systems (ITS); Vehicular Communications; Basic Set of Applications; Part 3: Specifications of Decentralized Environmental Notification Basic Service”.

ETSI TS 102 894-2 V1.3.1 (Aug. 2018), Technical Specification, “Intelligent Transport Systems (ITS); Users and applications requirements; Part 2: Applications and facilities layer common data dictionary”.

* cited by examiner

| SAE Level | Name | Narrative definition | | Execution of steering and acceleration/ deceleration | Monitoring of driving environment | Fallback performance of dynamic driving task | System capability (driving modes) |
|---|---|---|---|---|---|---|---|
| ***Human driver monitors the driving environment*** | | | | | | | |
| 0 | No Automation | The full-time performance by the human driver of all aspects of the dynamic driving task, even when "enhanced by warning or intervention systems" | | Human driver | Human driver | Human driver | n/a |
| 1 | Driver Assistance | The driving mode-specific execution by a driver assistance system of "either steering or acceleration/deceleration" | using information about the driving environment and with the expectation that the human driver performs all remaining aspects of the dynamic driving task | Human driver and system | | | Some driving modes |
| 2 | Partial Automation | The driving mode-specific execution by one or more driver assistance systems of *both steering and acceleration/deceleration* | | System | | | |
| ***Automated driving system monitors the driving environment*** | | | | | | | |
| 3 | Conditional Automation | The driving mode-specific performance by an automated driving system of all aspects of the dynamic driving task | with the expectation that the *human driver will respond appropriately to a request to intervene* | System | System | Human driver | Some driving modes |
| 4 | High Automation | | *even if a human driver does not respond appropriately to a request to intervene* the car can pull over safely by guiding system | | | System | Many driving modes |
| 5 | Full Automation | | *under all roadway and environmental conditions that can be managed by a human driver* | | | | All driving modes |

Fig.2

METHOD AND APPARATUS FOR VEHICLE APPLICATION

CROSS-REFERENCE TO RELATED APPLICATIONS

This patent application is a submission under 35 U.S.C. § 371 for U.S. national stage patent application of international application no. PCT/CN2021/142497 filed on Dec. 29, 2021 and entitled "METHOD AND APPARATUS FOR VEHICLE APPLICATION," the entirety of which is incorporated herein by reference.

FIELD OF THE INVENTION

The present disclosure generally relates to communication networks, and more specifically, to a method and apparatus for vehicle application.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting device-to-device (D2D) communication features in various applications is proposed. An extension for the D2D work may consist of supporting vehicle-to-everything (V2X) communication, which may include any combination of direct communications among vehicles, pedestrians and infrastructure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

V2X is a technology that allows a vehicle to communicate with any entity that may affect the vehicle, and vice versa. V2X may consist of more specific types of communication as vehicle-to-infrastructure (V2I), vehicle-to-network (V2N), vehicle-to-vehicle (V2V), vehicle-to-pedestrian (V2P), etc.

With the development of vehicle technology, autonomous driving has become no longer an imaginary function, but can be supported by more and more vehicles. A vehicle capable of autonomous driving may switch between driving modes (e.g., full automation, partial automation, no automation, etc.) according to a potential traffic risk. According to the existing solutions, the traffic risk is generally predicted by only considering basic sensor data such as location, speed and acceleration collected from the connected vehicles. However, the traffic risk may also be impacted by other aspects such as vehicle types, road design, accident events, driving pattern, etc. Therefore, it may be desirable to enhance the traffic risk prediction so as to support vehicle application in a more efficient way.

Various exemplary embodiments of the present disclosure propose a solution for vehicle application, which can generate a traffic risk index by performing data mining on various V2X messages (e.g., V2V/V2I messages, etc.), and enable a vehicle to determine, according to the traffic risk index, whether to switching driving modes and/or changing a routing plan.

According to a first aspect of the present disclosure, there is provided a method performed by a vehicle device (e.g., a vehicle, a car, a device installed or mounted in a vehicle/car, etc.). The method comprises: receiving a traffic risk index from a first server. The traffic risk index may indicate a traffic risk based on V2X message data. In accordance with an exemplary embodiment, the method further comprises: determining whether to perform one or more actions, according to the traffic risk index.

In accordance with an exemplary embodiment, the one or more actions may include one or more of: switching driving modes, adjusting route planning, changing a driving strategy, and alerting.

In accordance with an exemplary embodiment, when the traffic risk index is within a predetermined range, the vehicle device may determine to perform at least one of the one or more actions corresponding to the predetermined range.

In accordance with an exemplary embodiment, the determination of whether to perform the one or more actions may also be according to traffic data monitored by the vehicle device.

In accordance with an exemplary embodiment, the vehicle device may receive the traffic risk index from the first server periodically and/or on demand.

In accordance with an exemplary embodiment, the method according to the first aspect of the present disclosure may further comprise: transmitting a request for the traffic risk index to the first server.

In accordance with an exemplary embodiment, the request for the traffic risk index may include one or more of: a list of objects; one or more region identifiers (IDs) associated with the list of objects; and estimated time of arrival (ETA) corresponding to one or more region IDs.

In accordance with an exemplary embodiment, the traffic risk index may be associated with one or more of: a region, a time period, and a time instant.

In accordance with an exemplary embodiment, the V2X message data may be extracted from one or more V2X message reports of one or more devices. In an embodiment, the one or more V2X message reports may include information about one or more V2X messages which are exchanged between the one or more devices and one or more other devices.

In accordance with an exemplary embodiment, the one or more devices may include one or more of: one or more vehicle devices, one or more road side units (RSUs), and one or more traffic control entities.

In accordance with an exemplary embodiment, the method according to the first aspect of the present disclosure may further comprise: transmitting a V2X message report to a second server. In an embodiment, the V2X message report may include information about one or more V2X messages which are exchanged between the vehicle device and one or more other devices.

In accordance with an exemplary embodiment, the one or more V2X messages may include one or more V2V messages and/or one or more V2I messages.

In accordance with an exemplary embodiment, the vehicle device may transmit the V2X message report to the second server periodically and/or on demand.

In accordance with an exemplary embodiment, the first server may be a central application server, and the second server may be an edge application server.

In accordance with an exemplary embodiment, the first server and the second server may be implemented as a same application server.

According to a second aspect of the present disclosure, there is provided an apparatus which may be implemented as a vehicle device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a vehicle device. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method performed by a first server (e.g., a central application server, etc.). The method comprises: receiving a first traffic risk index from a second server (e.g., an edge application server, etc.). In an embodiment, the first traffic risk index may indicate a traffic risk based on V2X message data. In accordance with an exemplary embodiment, the method according to the fifth aspect of the present disclosure may further comprise: determining a second traffic risk index according to the first traffic risk index.

In accordance with an exemplary embodiment, the first traffic risk index may be associated with a region, a time period, and/or a time instant.

In accordance with an exemplary embodiment, the second traffic risk index may be associated with a region, a time period, and/or a time instant.

In accordance with an exemplary embodiment, the first traffic risk index may indicate a historical traffic risk of a region for a time period or at a time instant, while the second traffic risk index may indicate a predicted traffic risk of the region for the time period or at the time instant.

In accordance with an exemplary embodiment, the first server may receive the first traffic risk index from the second server periodically and/or on demand.

In accordance with an exemplary embodiment, the method according to the fifth aspect of the present disclosure may further comprise: receiving a request for the second traffic risk index from a vehicle device.

In accordance with an exemplary embodiment, the request for the second traffic risk index may include: a list of objects, one or more region IDs associated with the list of objects, and/or ETA corresponding to one or more region IDs.

In accordance with an exemplary embodiment, the method according to the fifth aspect of the present disclosure may further comprise: transmitting the second traffic risk index to a vehicle device.

In accordance with an exemplary embodiment, the first server may transmit the second traffic risk index to the vehicle device periodically and/or on demand.

In accordance with an exemplary embodiment, the V2X message data may be extracted from one or more V2X message reports of one or more devices. In an embodiment, the one or more V2X message reports may include information about one or more V2X messages which are exchanged between the one or more devices and one or more other devices.

In accordance with an exemplary embodiment, the one or more devices may include: one or more vehicle devices, one or more RSUs, and/or one or more traffic control entities.

In accordance with an exemplary embodiment, the one or more V2X messages may include one or more V2V messages and/or one or more V2I messages.

In accordance with an exemplary embodiment, the first server and the second server may be implemented as a same application server.

According to a sixth aspect of the present disclosure, there is provided an apparatus which may be implemented as a first server. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a first server. The apparatus may comprise a receiving unit and a determining unit. In accordance with some exemplary embodiments, the receiving unit may be operable to carry out at least the receiving step of the method according to the fifth aspect of the present disclosure. The determining unit may be operable to carry out at least the determining step of the method according to the fifth aspect of the present disclosure.

According to a ninth aspect of the present disclosure, there is provided a method performed by a second server (e.g., an edge application server, etc.). The method comprises: receiving one or more V2X message reports from one or more devices (e.g., one or more vehicle devices/RSUs/traffic control entities, etc.). In an embodiment, the one or more V2X message reports may include information about one or more V2X messages (e.g., one or more V2V messages and/or one or more V2I messages, etc.) which are exchanged between the one or more devices and one or more other devices. In accordance with an exemplary embodiment, the method further comprises: determining a traffic risk index based on V2X message data which may be extracted from the one or more V2X message reports.

In accordance with an exemplary embodiment, the V2X message data may be extracted from the one or more V2X message reports by analyzing the one or more V2X message reports according to geographic information.

In accordance with an exemplary embodiment, the V2X message data may include one or more metrics related to a traffic risk of a region for a time period or at a time instant.

In accordance with an exemplary embodiment, the second server may determine the traffic risk index according to the one or more metrics and one or more associated weights.

In accordance with an exemplary embodiment, the traffic risk index may be associated with a region, a time period, and/or a time instant.

In accordance with an exemplary embodiment, the second server may receive the one or more V2X message reports from the one or more devices periodically and/or on demand.

In accordance with an exemplary embodiment, the method according to the ninth aspect of the present disclosure may further comprise: transmitting the traffic risk index to a first server (e.g., a central application server, etc.) periodically and/or on demand.

According to a tenth aspect of the present disclosure, there is provided an apparatus which may be implemented as a second server. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a second server. The apparatus may comprise a receiving unit and a determining unit. In accordance with some exemplary embodiments, the receiving unit may be operable to carry out at least the receiving step of the method according to the ninth aspect of the present disclosure. The determining unit may be operable to carry out at least the determining step of the method according to the ninth aspect of the present disclosure.

According to various exemplary embodiments, various information valuable for predicting a potential traffic risk may be extracted from e.g. V2V/V2I messages to calculate an enhanced traffic risk index, and a vehicle may be able to adjust driving behaviors and/or navigation routes according to the enhanced traffic risk index, so as to achieve improved driving safety and efficiency.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 2 is a diagram illustrating exemplary automation levels for autonomous driving vehicles according to an embodiment of the present disclosure;

DETAILED DESCRIPTION

Figure 1:
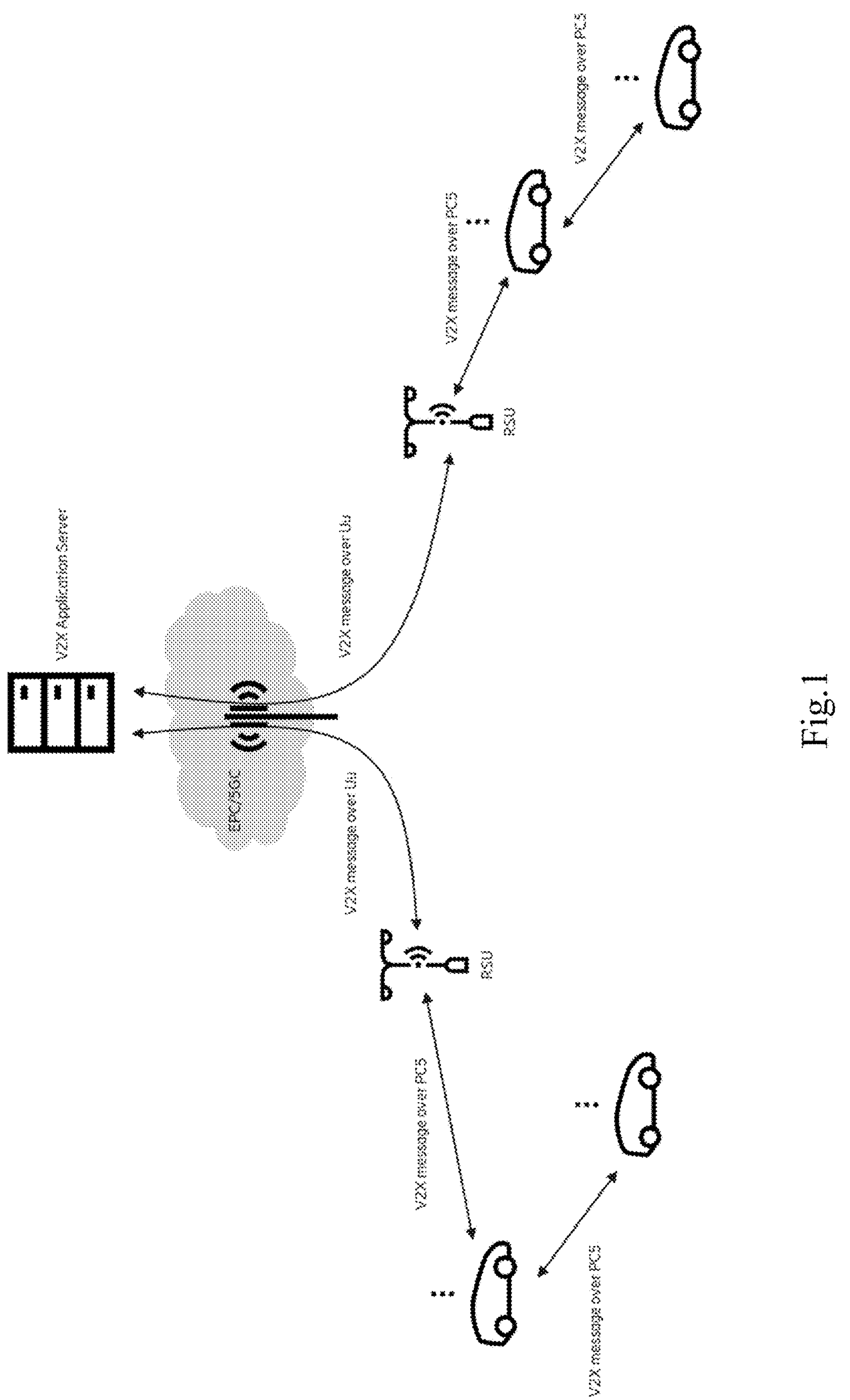
FIG. 1 is a diagram illustrating an exemplary network architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In recent years, a vehicle is becoming more and more intelligent in this cutting edge, and it can communicate with any other entity that can offer rich functionalities to drivers, such as multi-media experience, more safety experience, more smart navigation experience, etc.

When a vehicle is running on the road, the vehicle can send messages to other vehicles via a wireless communication network, and can also receive messages from other vehicles, so that the vehicle can take corresponding actions based on current situations after receiving V2V messages from other vehicles.

Wireless communication networks such as long-term evolution (LTE) and new radio (NR) networks may be expected to use V2X services and support communication for V2X capable user equipment (UE) such as a vehicle device. As an example, a cellular-vehicle to everything (C-V2X) solution may support various vehicle applications by using vehicle devices, road-side units (RSUs), and a cellular communication network. In an exemplary V2X application scenario, a vehicle device (e.g., a car, a vehicle, etc.) may exchange messages with RSUs and other vehicle devices, e.g., via the cellular communication network for some kinds of driving synergy.

FIG. 1 is a diagram illustrating an exemplary network architecture according to an embodiment of the present disclosure. In the network architecture shown in FIG. 1, C-V2X may allow a C-V2X device (e.g., a vehicle, a car, an in-vehicle device, etc.) to use the cellular network connection in the traditional manner over Uu interface. The Uu interface may refer to the logical interface between a user equipment (UE) and a base station. This is generally referred to V2N. However, due to the huge amount of message exchange especially for V2V communication, the 3rd generation partnership project (3GPP) also introduces PC5 interface (also known as "sidelink" in 3GPP radio access network (RAN) specification) to support direct communication between C-V2X devices to improve the C-V2X efficiency. As shown in FIG. 1, a vehicle may communicate with a road side unit (RSU) and/or another vehicle via a V2X message over PC5, and the RSU may communicate with an evolved packet core/fifth generation core (EPC/5GC) network through a RAN via a V2X message over Uu, so as to obtain services provided by a V2X application server. V2X may also be important for safe and efficient autonomous driving. For example, V2X communication can alert the autonomous driving vehicle about objects it cannot directly see (non-line-of-sight).

In automotive industry, autonomous driving may be a fantasy function for a driver, and it can bring fantastic experiences to the driver, helping the driver free hands during driving while still can keep them safety.

FIG. 2 is a diagram illustrating exemplary automation levels for autonomous driving vehicles according to an embodiment of the present disclosure. As shown in FIG. 2, there may be 6 automation levels (from level 0 to level 5) for autonomous driving vehicles, including "No Automation", "Driver Assistance", "Partial Automation", "Conditional Automation", "High Automation" and "Full Automation", as defined by society of automotive engineers (SAE) (J3016). Different automation levels may correspond to different driving modes. A vehicle may switch between driving modes when facing different conditions and contexts.

Since safety may have the highest priority in autonomous driving, it may be critical to apply a proper driving mode switch mechanism. A typical example is that if a vehicle currently in autonomous driving mode identifies a high risk ahead, it may switch to remote control mode or even manual driving mode. The decision of driving mode may be based on multiple risk factors, e.g., road condition, weather condition, traffic situation, driving condition, events, etc. A traffic risk index may enable autonomous driving vehicles to make such decision.

The existing traffic risk index may only be based on basic aspects such as traffic volume and average vehicle distance that are usually calculated by basic sensor data collected from connected vehicles (e.g., location, speed and acceleration). However, advanced aspects such as vehicle types, typical driving pattern, accident events may enhance the traffic risk index but requiring more sophisticated data sources.

Various exemplary embodiments of the present disclosure propose a solution for vehicle application to provide a traffic risk index as a comprehensive index which may be impacted by multiple factors, e.g., including but not limited to road design (e.g., slope and/or detour may increase the traffic risk), surrounding environment (e.g., the roads nearby a very busy logistics center may be in a higher traffic risk), driving behaviors (e.g., driving behaviors may be relevant to culture or regional regulations), etc. Since V2X messages such as V2V/V2I messages may contain a lot of valuable information which can directly or indirectly reflect the factors mentioned above, e.g., collision warning detected by lidar/radar, red light violation detected by a video camera equipped in an RSU, etc., V2V/V2I message data may be used according to exemplary embodiments to enhance the traffic risk index with advanced aspects (such as vehicle types, violation events, accident events, etc.).

In accordance with an exemplary embodiment, vehicles may periodically upload V2V message logs to an edge application server. Alternatively or additionally, RSUs may also periodically upload V2I message logs to the edge application server. The edge application server may perform a data processing procedure to calculate a regional traffic risk index relevant to the serving area of the edge application server based on the V2V/V2I message logs. In accordance with another exemplary embodiment, the edge application server may forward the regional traffic risk index related data to a central application server for data aggregation. The central application server may generate a traffic risk index based at least in part on data mining on V2V/V2I messages which may contain a lot of valuable information to enhance the traffic risk index. In accordance with exemplary embodiments, the enhanced traffic risk index may be used for autonomous driving vehicles to make decision of driving mode switch to improve safety, and/or to adjust route planning to save time and reduce energy consumption.

Figure 3A:
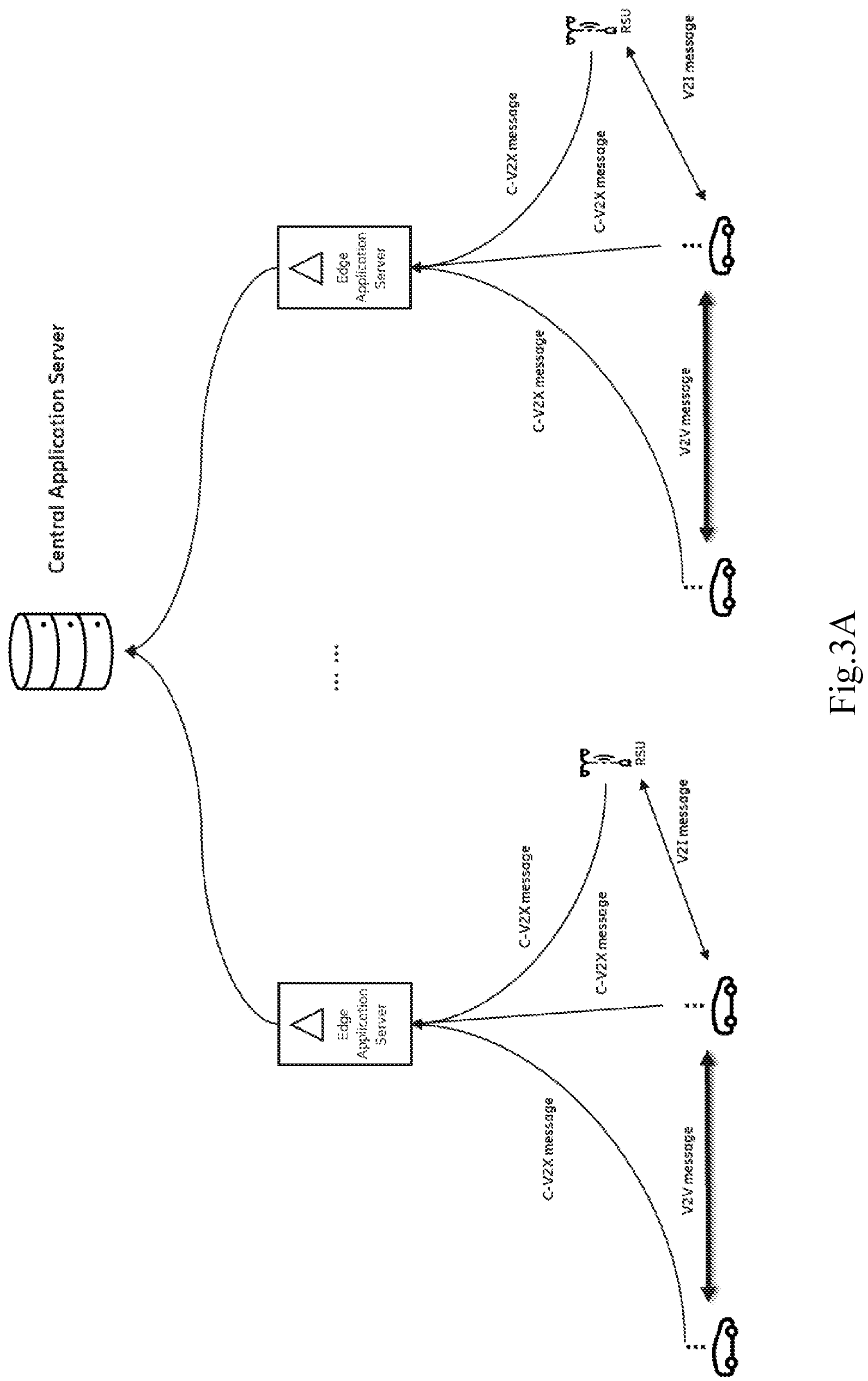
FIG. 3A is a diagram illustrating an exemplary system overview according to an embodiment of the present disclosure.

FIG. 3A is a diagram illustrating an exemplary system overview according to an embodiment of the present disclosure. For simplicity, FIG. 3A only schematically depicts some sub-systems in the exemplary system architecture, e.g., including vehicles connected to the system, RSUs, edge application servers and a central application server. As shown in FIG. 3A, a vehicle with network connectivity can communicate bidirectionally with other systems or entities outside the vehicle. A connected vehicle also can communicate with another vehicle using direct communication technologies such as PC5 or dedicated short-range communications (DSRC). An RSU may collect traffic data from a static sensing area along a road and transmit the data to vehicles using direct communication technologies (e.g., PC5 or DSRC) as well as a central traffic management center. An edge application server can provide a data analytics function for regional V2V/V2I message log(s). The input of the function may be the regional V2V/V2I message log(s) and the output may be a regional/periodical traffic risk index. Due to the massive amount of V2V/V2I message log data, the edge-based architecture may provide the benefit of computation and network bandwidth offloading. The central application server can provide a data analytics function for a global traffic risk index. The input of the function may be one or more regional/periodical traffic risk indexes from one or multiple edge application servers, and the output may be a global traffic risk index.

As shown in FIG. 3A, various interfaces may be configured for different sub-systems to support information exchange and data communication. For example, a connected vehicle may use direct communication technology, e.g., PC5 to exchange information with others via a V2V messaging interface. An RSU may use direction communication technology, e.g., PC5 to exchange information with others via V2I messaging interface. A connected vehicle/RSU may use a bidirectional protocol to communicate with a central application server and/or an edge application server via C-V2X messaging interface. The main content of a C-V2X message may include logs, sensor data, remote control commands, etc.

It can be appreciated that the sub-systems and various interfaces shown in FIG. 3A are just as examples, and more or less alternative sub-systems and interfaces may be involved in the traffic risk prediction according to embodiments of the present disclosure.

In accordance with an exemplary embodiment, a traffic risk index may be based on geographic information system (GIS) objects (e.g., road segments, street blocks, etc.). In this case, the edge application server and the central application server may each have a GIS system that contains the definition of the GIS objects. Table 1 gives an example of road segment data schema.

TABLE 1

| Attribute | Data Type | Unit | Description |
|---|---|---|---|
| Road Segment Id | String | — | Unique ID of the road segment. |
| Geometry | Array (Line) | | The geometry data in the road segment, typically are multiple lines. |
| Name | String | — | The name of the road segment. |
| Length | Numeric | meter | |
| Width | Numeric | meter | |
| Lane number | Integer | — | |
| Direction | Integer | degree | The angle of traffic direction (0-360). |
| Road level | Integer | Enum Index | 0: primary<br>1: secondary<br>2: tertiary<br>3: residential<br>4: highway |

Figure 3B:
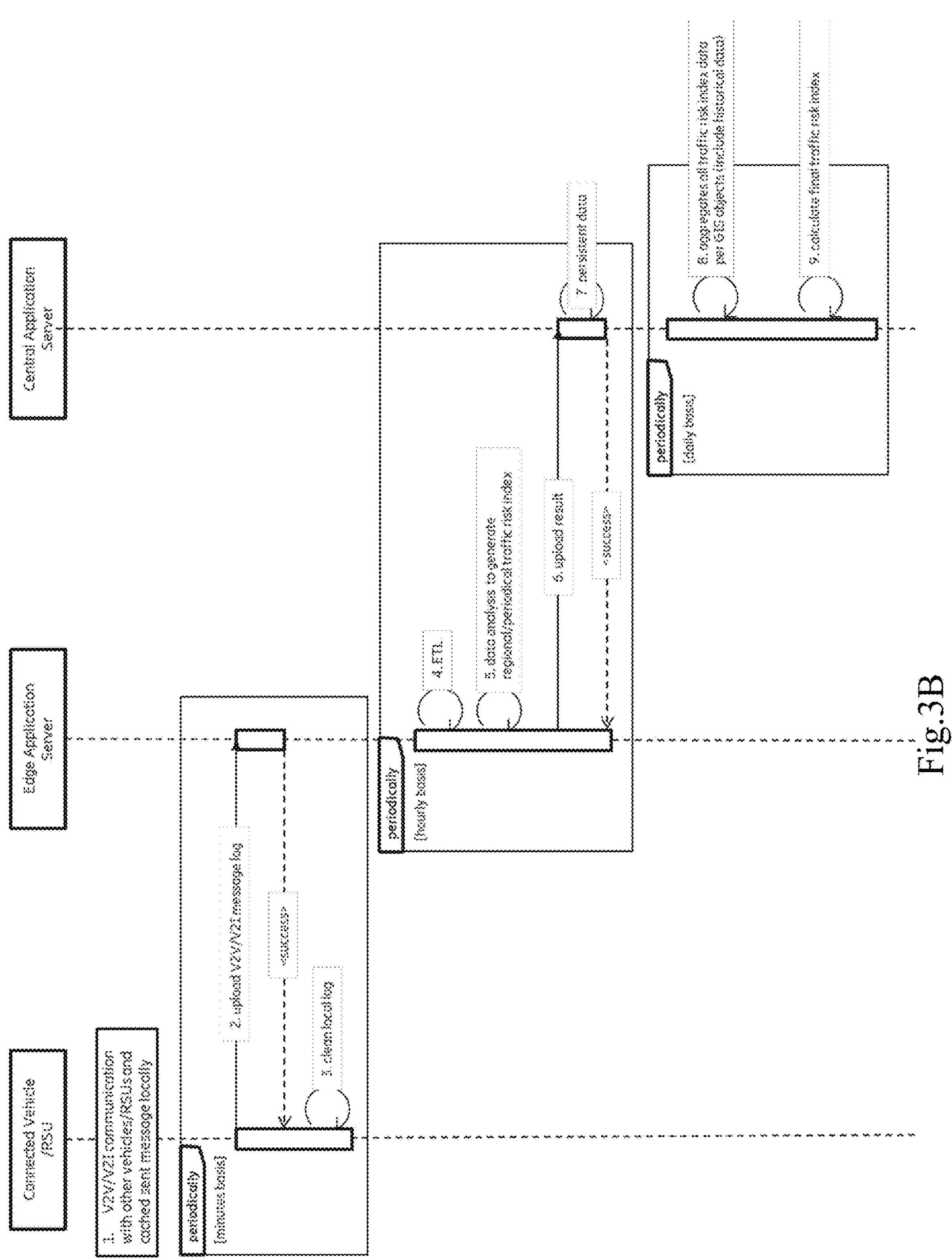
FIG. 3B is a diagram illustrating an exemplary procedure according to an embodiment of the present disclosure.

FIG. 3B is a diagram illustrating an exemplary procedure according to an embodiment of the present disclosure. The procedure may be used to collect and analyze V2X (e.g., V2X/V2I, etc.) message data, so that a traffic risk index may be determined based on data analysis on the V2X message data. It can be appreciated that network elements and signaling messages shown in FIG. 3B are just as examples, and more or less alternative network elements and signaling messages may be involved in the procedure for obtaining the traffic risk index according to various embodiments of the present disclosure. As shown in FIG. 3B, the procedure may include the following operations:

1. A connected vehicle may communicate with one or more other vehicles via direct V2V messages. The connected vehicle may also communicate with an RSU via one or more direct V2I messages. In an embodiment, the connected vehicle/RSU may log in a local storage the V2V/V2I messages sent to the one or more other vehicles and the RSU. Only caching the sent V2V/V2I messages can avoid excessive redundancy.
2. The connected vehicle/RSU may send the cached V2V/V2I message logs to an edge application server periodically (e.g., on minute basis, etc.).
3. After the V2V/V2I message logs are successfully sent to the edge application server, the message log data locally cached at the connected vehicle/RSU may be deleted.
4. The edge application server may trigger periodically (e.g., on hourly basis, etc.) a data analytics procedure for the V2V/V2I message logs received from one or more vehicles/RSUs. In an embodiment, the edge application server may perform data ETL (Extract, Transform, Load) based on the original V2V/V2I message log data. As an example, Table 2 lists some exemplary attributes which may be calculated for each GIS object as V2V/V2I data analytics intermediate results.

TABLE 2

| Attribute | Data Type | Unit | Description |
|---|---|---|---|
| Traffic volume (Passing vehicle number) | Numeric | number/hour | Average number of vehicles passing by hour. |
| Average speed | Numeric | km/h | Average vehicle speed per hour, the speed may be calculated hourly. |
| CAM number | Numeric | number/hour | Average generated CAM (Cooperative Awareness Message) by hour. |
| Special vehicle number | Numeric | number/hour | Average special cars by hour. Special vehicles may include public transport vehicle, special transport vehicle (e.g. heavy load vehicle, excess length vehicle), vehicle with dangerous goods, rescue vehicle, emergency vehicle and so on. A relevant V2V message container: CAM.specialVehicleContainer |
| Traffic condition event number | Numeric | number/hour | DENM (Decentralized Environmental Notification Message) action number's sub-item statistics. Break down according to the event caused code defined in clause 7.1.4 of ETSI EN 302 637-3. |

TABLE 2-continued

| Attribute | Data Type | Unit | Description |
|---|---|---|---|
| | | | A relevant V2V message container: DENM.SituationContainer.eventType.trafficCondition |
| Accident event number | Numeric | number/hour | DENM action number's sub-item statistics. A relevant V2V message container: DENM.SituationContainer.eventType.accident |
| Road work event number | Numeric | number/hour | DENM action number's sub-item statistics. A relevant V2V message container: DENM.SituationContainer.eventType.roadworks |
| Hazardous location - Animal on the road event number | Numeric | number/hour | DENM action number's sub-item statistics. A relevant V2V message container: DENM.SituationContainer.eventType.hazardousLocation-AnimalOnTheRoad |
| Human presence on the road event number | Numeric | number/hour | DENM action number's sub-item statistics. A relevant V2V message container: DENM.SituationContainer.eventType.humanPresenceOnTheRoad |
| Wrong way driving event number | Numeric | number/hour | DENM action number's sub-item statistics. A relevant V2V message container: DENM.SituationContainer.eventType.wrongWayDriving |
| Rescue and recovery work event number | Numeric | number/hour | DENM action number's sub-item statistics. A relevant V2V message container: DENM.SituationContainer.eventType.rescueAndRecoveryWorkInProgress |
| Collision risk event number | Numeric | number/hour | DENM action number's sub-item statistics. A relevant V2V message container: DENM.SituationContainer.eventType.collisionRisk |
| Signal violation event number | Numeric | number/hour | DENM action number's sub-item statistics. A relevant V2V message container: DENM.SituationContainer.eventType.signalViolation |

5. The edge application server may further process the data related to the V2V/V2I message logs as below:
   - Cluster V2V/V2I message log data based on the GIS objects (e.g., road segments, street blocks, etc.).
   - Calculate a regional/periodical traffic risk index for those GIS objects.

In accordance with an exemplary embodiment, the edge application server may calculate a traffic risk index $C_{v2v}$ according to the following formula:

$$C_{v2v} = \sum_{i=1}^{k} \left(\text{weight}_i \times \text{metric}_i / \text{traffic\_volume}\right) \quad (1)$$

where traffic_volume∈(0, ∞), which may represent the number of passing vehicles as described in Table 2, $\text{weight}_i$ is a weight coefficient of $\text{metric}_i$, i is an index of a metric (e.g., the metric may be any attribute such as "Special vehicle number", "Traffic condition event number", "Accident event number", "Human presence on the road event number", etc. as listed in Table 2, or any other suitable metric which may be derived from V2V/V2I message log data), and k is the total number of metrics.

In accordance with an exemplary embodiment, each metric may be standardized or normalized in one or more of the following ways:
   - Use basic information of the road section to standardize the metric, e.g., length, width, number of lanes, road section level, etc.;
   - Use vehicle statistics of the road section to standardize the metric, e.g., traffic volume, etc., as shown in formula (1);
   - Using a combination of the two above to standardize the metric.

According to formula (1), each standardized metric may be multiplied by the corresponding weight. As an example. Table 3 lists the weights of some exemplary metrics.

TABLE 3

| Attribute | Weight | Description |
|---|---|---|
| Traffic volume (Passing vehicle number) | 0% | Overlap with telematics data. Considering that the central server can collect both V2V data and Telemetric data, this metrics may be excluded in the calculate. |
| Average speed | 0% | Overlap with telematics data. Considering that the central server can collect both V2V data and Telemetric data, this metrics may be excluded in the calculate. |
| CAM number | 5% | The number of CAMs can describe the frequency of vehicle position and state changes in the road segment. A large value in this field indicates that vehicles on this road section are busier and noisy, and there are more interactions. |
| Special vehicle number | 5% | The more special vehicles on the road, the greater the traffic risk. |
| Traffic condition event number | 10% | The more traffic conditions, the greater the risk of the road section. |
| Accident event number | 15% | The accident rate is a very straightforward expression of the risk of the road section, so this field has a higher weight. |

TABLE 3-continued

| Attribute | Weight | Description |
|---|---|---|
| Road work event number | 10% | Road construction adds more risks to the road. |
| Hazardous location - Animal on the road event number | 5% | Animals often pass by on some roads, and vehicles need to avoid, which introduces more risks. |
| Human presence on the road event number | 15% | Pedestrians crossing the road are also a major source of risk. |
| Wrong way driving event number | 10% | The occurrence of wrong way driving means that the traffic conditions on the road section are poor. |
| Rescue and recovery work event number | 5% | |
| Collision risk event number | 15% | When there is collision risk, vehicles can use V2V messages to broadcast notifications to each other. The more such notifications, the higher the traffic risk. |
| Signal violation event number | 5% | Through the interaction between traffic lights and RSU, it can be detected whether there are signal violation incidents. The more such incidents, the higher the traffic risk. |

In accordance with an exemplary embodiment, all the weighted metrics may be added up to get a score. This score may be a comparable number which is greater than 0, and it can describe the traffic risk of a road segment based on the V2V/V2I message data. In an embodiment, the edge application server may determine a regional/periodical traffic risk index according to this score. Table 4 shows a traffic risk index determined by the edge application server for a region with a road segment ID and for a certain period time with a time stamp.

TABLE 4

| Attribute | Description |
|---|---|
| Road Segment ID | |
| Time period | Time period on hourly basis, e.g., 9:00 or any other time instant or time period. |
| Traffic Risk Index | |

6. The edge application server may send the regional/periodical traffic risk index to a central application server.
7. The central application server may persist the regional/periodical traffic risk index data from one or more edge application servers.
8. The central application server may trigger a data aggregation and/or prediction procedure periodically (e.g., on daily basis, etc.). In an embodiment, the central application server may aggregate all traffic risk index data (e.g., including the historical data already in the central application server) per GIS object (e.g., road segments). Then the central application server may get time series-based traffic risk index data per GIS object.

In accordance with an exemplary embodiment, the central application server may combine current day data and historical data as an entire time series. From this time series a numerical value can be calculated to forecast the near future traffic risk situation. In common practice, the historical data in the time series may need to be attenuated to make the predicted data both time-sensitive and completion.

9. The central application server may perform time series analysis for the time series-based traffic risk index data per GIS object.

In accordance with an exemplary embodiment, an exponential smoothing method may be used to do the time series prediction. The central application server may calculate the data in the day and hour dimensions to show the basic periodicity. In an embodiment, the central application server may calculate a predicted traffic risk index $Y_{(d+1)h}$ according to the following formula:

$$Y_{(d+1)h} = \alpha y_{dh} + (1-\alpha) Y_{dh} \tag{2}$$

d represents a specific day;

d+1 represents the day after the specific day;

h represents a specific hour;

$\alpha$ is the smoothing factor, where $\alpha \in (0,1)$ and the larger the value of $\alpha$, the more inclined to adopt the latest data;

$y_{dh}$ represents the statistics metric for a specified hour of the current day, which may be based on or equal to the traffic risk index $C_{v2v}$ calculated according to formula (1) and sent to the central application server by the edge application server;

$Y_{(d+1)h}$ represents the predicted metric for a specified hour of the day after the current day; and $Y_{dh}$ represents the predicted metric for a specified hour of the current day (e.g., the initial value of $Y_{dh}$ may be set to zero or any other suitable value).

According to the time series prediction, e.g., as described above, the central application server can get a time pattern (e.g., hourly pattern, which may include day of week or special days) of the traffic risk index per GIS object. In this way, the central application server can calculate the global traffic risk index. Table 5 shows a traffic risk index determined by the central application server for a region with a road segment ID and for a certain period time with a time stamp.

TABLE 5

| Attribute | Description |
|---|---|
| Road Segment ID | |
| Time period | Time period on hourly basis, e.g., 9:00 or any other time instant or time period. |
| Day of Week (optional) | Day of week, e.g., Monday, etc. |
| Traffic Risk Index | |

It can be appreciated that attributes, parameters and values thereof shown in Tables 1-5 are just as examples, and more or less alternative attributes, parameters and values as well as associated configurations and settings may be applied in the implementations of the proposed solutions according to various embodiments of the present disclosure.

Figure 3C:
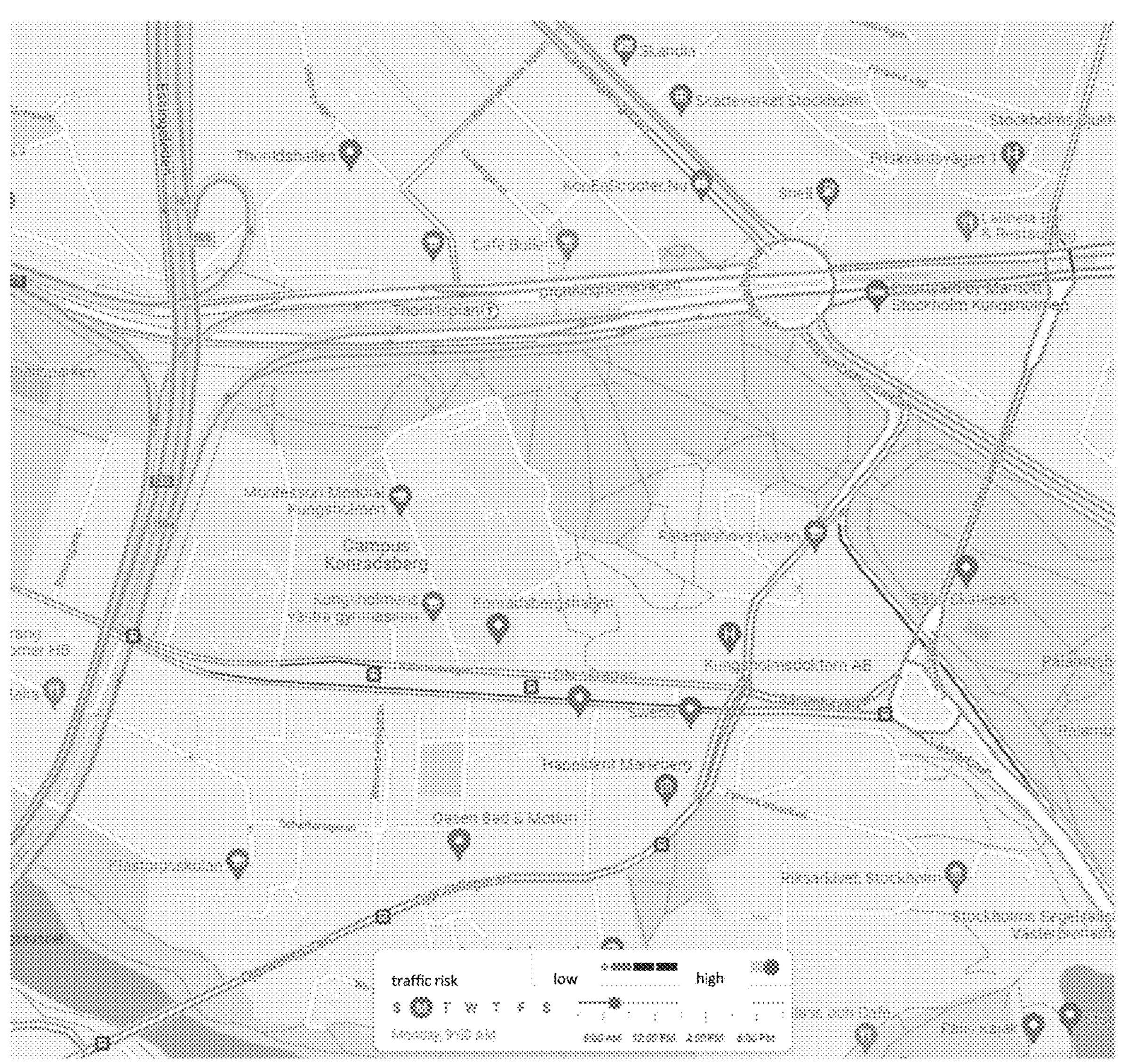
FIG. 3C is a diagram illustrating exemplary traffic risk index visualization according to an embodiment of the present disclosure.

FIG. 3C is a diagram illustrating exemplary traffic risk index visualization according to an embodiment of the present disclosure. By selecting different days of week and time periods, the traffic risk index may be visualized on the road segments with different colors and/or any other suitable visual elements. For example, green color may represent low risk level, and red color may represent high risk level. If the global traffic risk index is visualized on a map, it may look like the picture as shown in FIG. 3C.

Figure 4A:
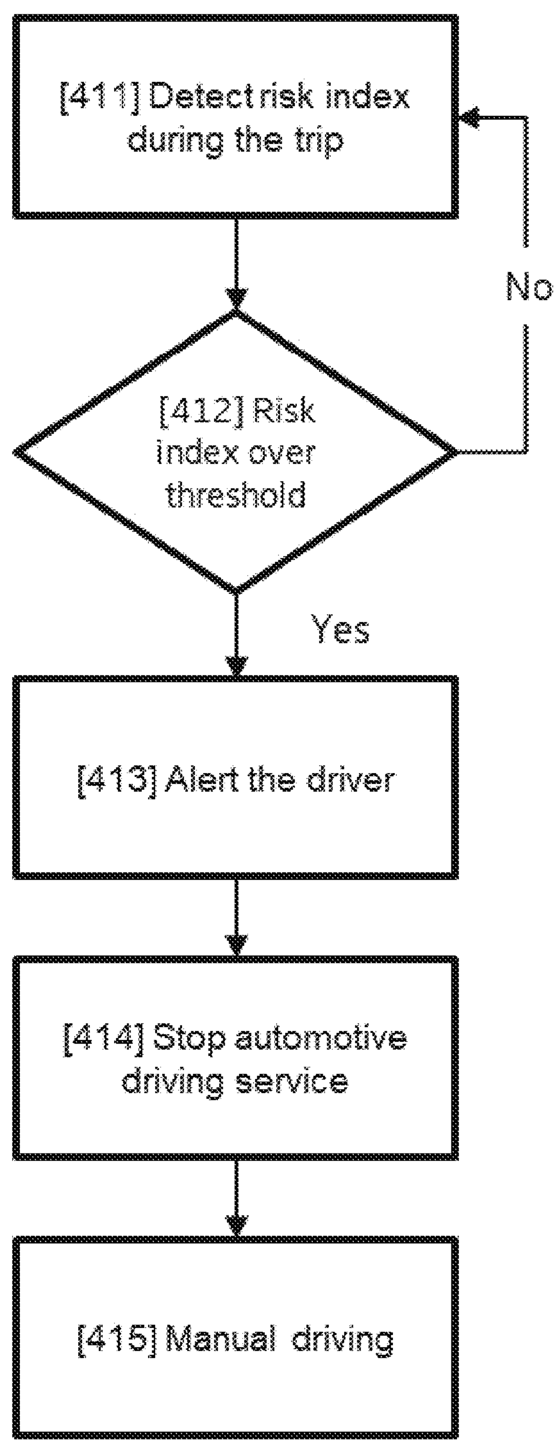
FIG. 4A is a diagram illustrating an exemplary procedure for driving mode switch according to an embodiment of the present disclosure.

FIG. 4A is a diagram illustrating an exemplary procedure for driving mode switch according to an embodiment of the present disclosure. When an autonomous driving vehicle is on L1-L3 (e.g., level 1-level 3 as described in FIG. 2), it may switch driving modes between autonomous driving and manual driving. The traffic risk index may be used to decide the driving mode switch. According to the procedure in FIG. 4A, during the trip, the autonomous driving vehicle may send a 'Query Traffic Risk Index' request to a central application server, and store locally the traffic index data based on a response from the central application server. In an embodiment, the request and/or the response may contain a road segment ID and the corresponding estimated time of arrival (ETA). At the same time, the autonomous driving vehicle may detect the traffic risk index which is received from the response, as shown in step 411.

In step 412, the autonomous driving vehicle may base on the response from the central application server to judge if the traffic risk index is over a threshold (e.g., the threshold of real traffic risk, etc.) or not. If the traffic risk index is not over the threshold, the autonomous driving vehicle may continuously detect the traffic risk index during the trip. When the traffic risk index is over the threshold, the autonomous driving vehicle may alert the driver in step 413 and stop the autonomous driving service in step 414. In response to the signal of stopping autonomous driving, the autonomous driving vehicle may notify the driver to take up driving and stop the autonomous driving. Then the vehicle may turn to manual driving mode in step 415.

Figure 4B:
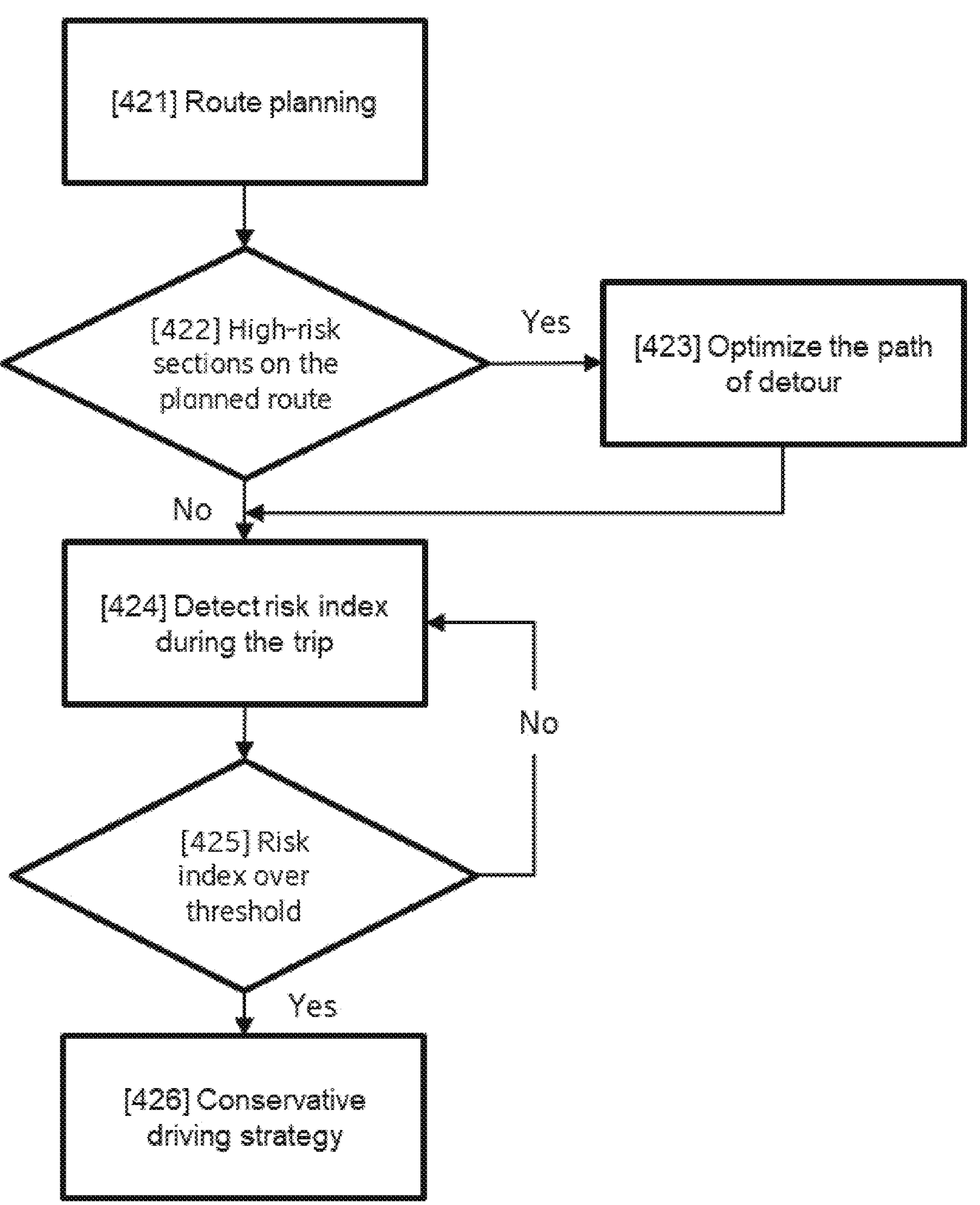
FIG. 4B is a diagram illustrating an exemplary procedure for routing planning according to an embodiment of the present disclosure.

FIG. 4B is a diagram illustrating an exemplary procedure for routing planning according to an embodiment of the present disclosure. When an autonomous driving vehicle is on L4-L5 (e.g., level 4-level 5 as described in FIG. 2), it may only support pure autonomous driving mode. In this case, a traffic risk index may be used to do routing planning to avoid passing road segments in a high traffic risk. According to the procedure in FIG. 4B, the autonomous driving vehicle may do route planning or navigation in step 421, at the same time the autonomous driving vehicle may send a 'Query Traffic Risk Index' request to a central application server that stores the traffic risk index data and provides the query service. The request may include a list of road segment objects representing a route. Each object may contain a road segment ID and the corresponding ETA. Based on the traffic risk index data received from the central application server, the autonomous driving vehicle may determine in step 422 whether there is any high-risk section in the selected path. If the selected path contains one or more high-risk sections, then the autonomous driving vehicle may optimize the route of the trip in step 423 and prompt path re-selection options, then the driver may select a suggested path or a default path. During the trip, the autonomous driving vehicle may continuously query the traffic risk index based on the actual arrival time from the central application server in step 424 and monitor the traffic risk index. In step 425, the autonomous driving vehicle may base on the response data from the central application server to judge if the traffic risk index is over a threshold or not. If the traffic risk index is not over the threshold, the autonomous driving vehicle may continuously detect the traffic risk index during the trip. When the traffic risk index is over the threshold, the autonomous driving vehicle may turn to a conservative driving strategy in step 426, e.g., slowing down the speed and keeping a long enough distance to one or more front vehicles.

Figure 5A:
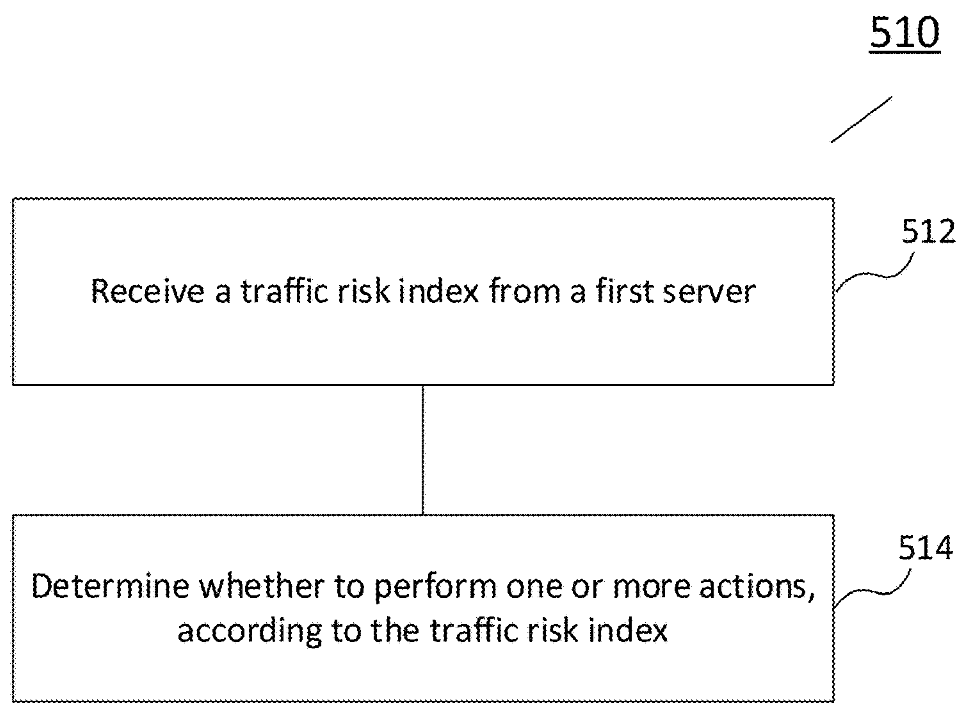
FIGS. 5A-5C are flowcharts illustrating various methods according to some embodiments of the present disclosure.

FIG. 5A is a flowchart illustrating a method 510 according to some embodiments of the present disclosure. The method 510 illustrated in FIG. 5A may be performed by a vehicle device (e.g., a vehicle, a car, a device installed or mounted in a vehicle/car, etc.) or an apparatus communicatively coupled to the vehicle device. In accordance with an exemplary embodiment, the vehicle device may be configured to communicate with an application server (e.g., an edge application server, a central application server, etc.) to obtain various vehicle services provided by the application server. In accordance with another exemplary embodiment, the vehicle device may be configured to support D2D communications so as to exchange information with one or more other devices (e.g., via V2X messaging, etc.).

According to the exemplary method 510 illustrated in FIG. 5A, the vehicle device may receive a traffic risk index from a first server, as shown in block 512. The traffic risk index may indicate a traffic risk based on V2X message data. In accordance with an exemplary embodiment, the vehicle device may determine whether to perform one or more actions, according to the traffic risk index, as shown in block 514.

In accordance with an exemplary embodiment, the one or more actions may include one or more of: switching driving modes, adjusting route planning, changing a driving strategy, and alerting.

In accordance with an exemplary embodiment, when the traffic risk index is within a predetermined range, the vehicle device may determine to perform at least one of the one or more actions corresponding to the predetermined range.

In accordance with an exemplary embodiment, the determination of whether to perform the one or more actions may also be according to traffic data monitored by the vehicle device.

In accordance with an exemplary embodiment, the vehicle device may receive the traffic risk index from the first server periodically and/or on demand.

In accordance with an exemplary embodiment, the vehicle device may transmit a request for the traffic risk index to the first server. In an embodiment, the request for the traffic risk index may include one or more of:

a list of objects (e.g., road segment objects, etc.);

one or more region IDs (e.g., road segment IDs, etc.) associated with the list of objects; and ETA corresponding to one or more region IDs.

In accordance with an exemplary embodiment, the traffic risk index may be associated with a region (e.g., a street block, a road segment, etc.), a time period (e.g., several minutes, an hour, etc.), and/or a time instant (e.g., 9:00 am, 6:00 pm, etc.).

In accordance with an exemplary embodiment, the V2X message data may be extracted from one or more V2X message reports of one or more devices. In an embodiment, the one or more V2X message reports may include information about one or more V2X messages that are exchanged between the one or more devices and one or more other devices.

In accordance with an exemplary embodiment, the one or more devices may include: one or more vehicle devices, one or more RSUs, and/or one or more traffic control entities.

In accordance with an exemplary embodiment, the vehicle device may transmit a V2X message report to a second server. In an embodiment, the V2X message report may include information about one or more V2X messages that are exchanged between the vehicle device and one or more other devices.

In accordance with an exemplary embodiment, the one or more V2X messages may include one or more V2V messages and/or one or more V2I messages.

In accordance with an exemplary embodiment, the vehicle device may transmit the V2X message report to the second server periodically and/or on demand.

In accordance with an exemplary embodiment, the first server may be a central application server, and the second server may be an edge application server. In an embodiment, the first server and the second server may be implemented as a same application server. In another embodiment, the first server and the second server may be implemented as separate application servers.

Figure 5B:
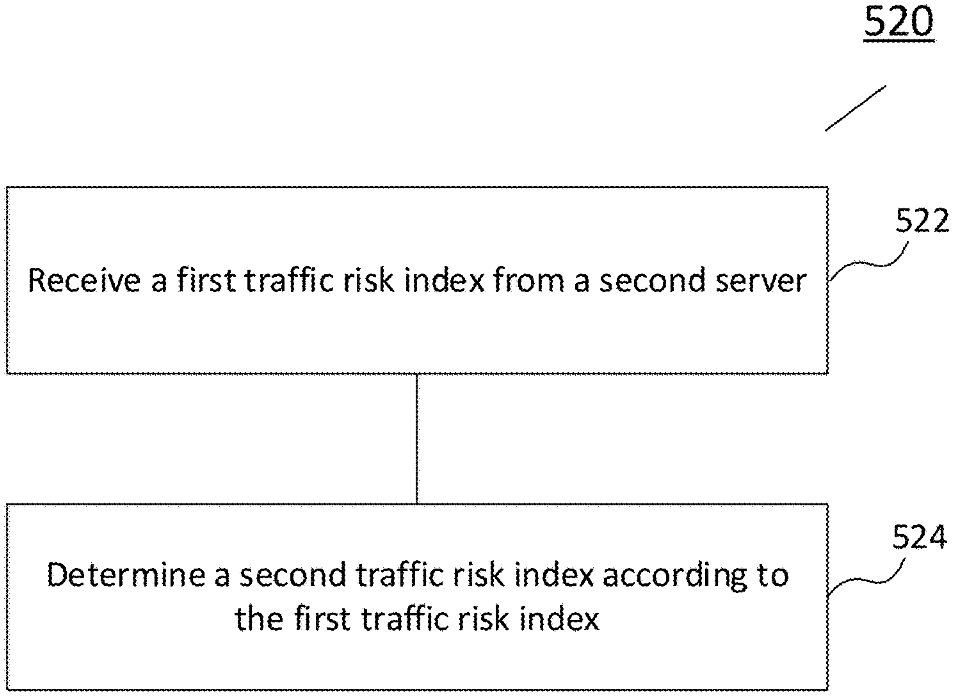

FIG. 5B is a flowchart illustrating a method 520 according to some embodiments of the present disclosure. The method 520 illustrated in FIG. 5B may be performed by a first server (e.g., a central application server, etc.) or an apparatus communicatively coupled to the first server. In accordance with an exemplary embodiment, the first server may be configured to support or provision various vehicle services to one or more vehicle devices. In an exemplary embodiment, the first server may be configured to communicate with another server (e.g., an edge application server, etc.) to implement application provision and/or management of one or more vehicles or in-vehicle devices.

According to the exemplary method 520 illustrated in FIG. 5B, the first server may receive a first traffic risk index from a second server (e.g., an edge application server, etc.), as shown in block 522. The first traffic risk index may indicate a traffic risk based on V2X message data. In accordance with an exemplary embodiment, the first server may determine a second traffic risk index (e.g., the traffic risk index as described with respect to FIG. 5A) according to the first traffic risk index, as shown in block 524.

In accordance with an exemplary embodiment, the first traffic risk index may be associated with a region, a time period, and/or a time instant. Alternatively or additionally, the second traffic risk index may be associated with a region, a time period, and/or a time instant. In an embodiment, the first server may use formula (2) to determine the second traffic risk index (e.g., $Y_{(d+1)h}$ in formula (2)) according to the first traffic risk index (e.g., $y_{dh}$ in formula (2)).

In accordance with an exemplary embodiment, the first traffic risk index may indicate a historical traffic risk of a region for a time period or at a time instant, while the second traffic risk index may indicate a predicted traffic risk of the region for the time period or at the time instant.

In accordance with an exemplary embodiment, the first server may receive the first traffic risk index from the second server periodically and/or on demand.

In accordance with an exemplary embodiment, the first server may receive a request for the second traffic risk index from a vehicle device (e.g., the vehicle device as described with respect to FIG. 5A).

In accordance with an exemplary embodiment, the request for the second traffic risk index may include: a list of objects; one or more region IDs associated with the list of objects; and/or ETA corresponding to one or more region IDs.

In accordance with an exemplary embodiment, the first server may transmit the second traffic risk index to a vehicle device (e.g., the vehicle device as described with respect to FIG. 5A). In an embodiment, the first server may transmit the second traffic risk index to the vehicle device periodically and/or on demand.

In accordance with an exemplary embodiment, the V2X message data may be extracted from one or more V2X message reports of one or more devices. In an embodiment, the one or more V2X message reports may include information about one or more V2X messages (e.g., one or more V2V messages and/or one or more V2I messages, etc.) that are exchanged between the one or more devices and one or more other devices.

In accordance with an exemplary embodiment, the one or more devices may include: one or more vehicle devices, one or more RSUs, and/or one or more traffic control entities.

In accordance with an exemplary embodiment, the first server and the second server may be implemented as a same application server or separate application servers.

Figure 5C:
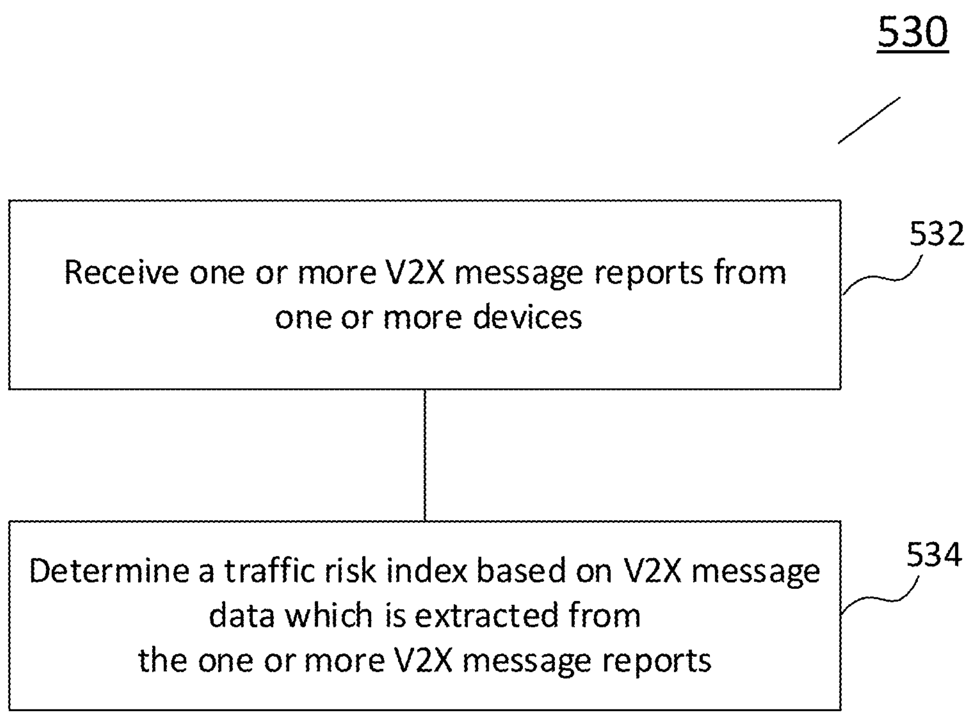

FIG. 5C is a flowchart illustrating a method 530 according to some embodiments of the present disclosure. The method 530 illustrated in FIG. 5C may be performed by a second server (e.g., an edge application server, etc.) or an apparatus communicatively coupled to the second server. In accordance with an exemplary embodiment, the second server may be configured to support or provision various vehicle services to one or more vehicle devices. In an exemplary embodiment, the second server may be configured to communicate with another server (e.g., a central application server, etc.) to implement application provision and/or management of one or more vehicles or in-vehicle devices.

According to the exemplary method 530 illustrated in FIG. 5C, the second server may receive one or more V2X message reports from one or more devices (e.g., one or more vehicle devices/RSUs/traffic control entities, etc.), as shown in block 532. The one or more V2X message reports may include information about one or more V2X messages (e.g., one or more V2V/V2I messages, etc.) which are exchanged between the one or more devices and one or more other devices. In accordance with an exemplary embodiment, the second server may determine a traffic risk index (e.g., the first traffic risk index as described with respect to FIG. 5B) based on V2X message data which is extracted from the one or more V2X message reports, as shown in block 534. In an embodiment, the traffic risk index may be associated with a region, a time period, and/or a time instant.

In accordance with an exemplary embodiment, the V2X message data may be extracted from the one or more V2X message reports by analyzing the one or more V2X message reports according to geographic information.

In accordance with an exemplary embodiment, the V2X message data may include one or more metrics related to a traffic risk of a region for a time period or at a time instant. In an embodiment, the second server may determine the traffic risk index according to the one or more metrics and one or more associated weights. For example, the second server may determine the traffic risk index (e.g., $C_{v2v}$) according to formula (1).

In accordance with an exemplary embodiment, the second server may receive the one or more V2X message reports from the one or more devices periodically and/or on demand.

In accordance with an exemplary embodiment, the second server may transmit the traffic risk index to a first server (e.g., the first server as described with respect to FIG. 5B) periodically and/or on demand.

The various blocks shown in FIGS. 5A-5C may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
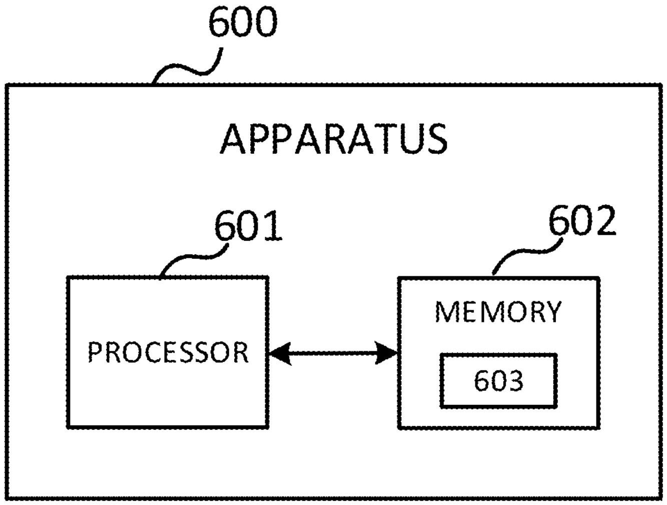
FIG. 6 is a block diagram illustrating an apparatus according to an embodiment of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a vehicle device as described with respect to FIG. 5A, or a first server as described with respect to FIG. 5B, or a second server as described with respect to FIG. 5C. In such cases, the apparatus 600 may be implemented as a vehicle device as described with respect to FIG. 5A, or a first server as described with respect to FIG. 5B, or a second server as described with respect to FIG. 5C.

In some implementations, the one or more memories 602 and the computer program codes 603 may be configured to, with the one or more processors 601, cause the apparatus 600 at least to perform any operation of the method as described in connection with FIG. 5A. In other implementations, the one or more memories 602 and the computer program codes 603 may be configured to, with the one or more processors 601, cause the apparatus 600 at least to perform any operation of the method as described in connection with FIG. 5B. In other implementations, the one or more memories 602 and the computer program codes 603 may be configured to, with the one or more processors 601, cause the apparatus 600 at least to perform any operation of the method as described in connection with FIG. 5C. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7A:
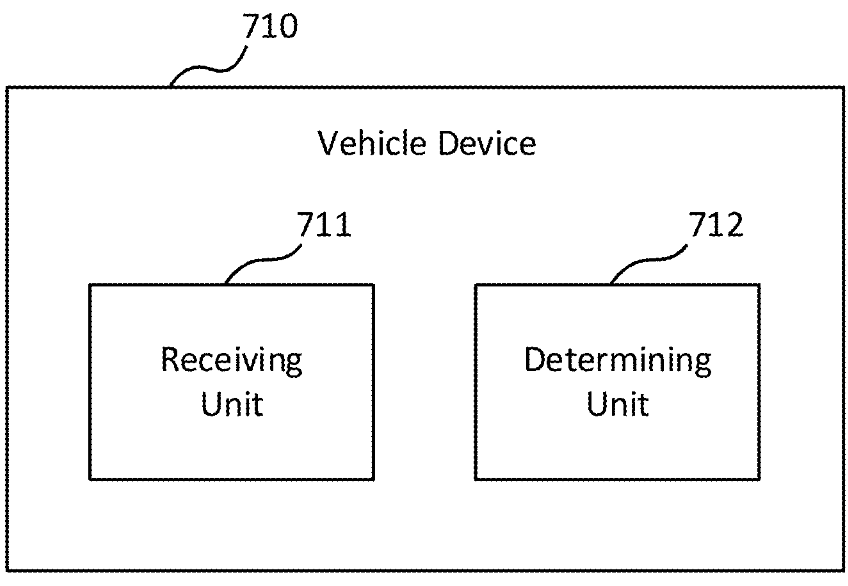
FIG. 7A-7C are block diagrams illustrating various apparatus according to some embodiments of the present disclosure.

FIG. 7A is a block diagram illustrating an apparatus 710 according to some embodiments of the present disclosure. As shown in FIG. 7A, the apparatus 710 may comprise a receiving unit 711 and a determining unit 712. In an exemplary embodiment, the apparatus 710 may be implemented in a vehicle device. The receiving unit 711 may be operable to carry out the operation in block 512, and the determining unit 712 may be operable to carry out the operation in block 514. Optionally, the receiving unit 711 and/or the determining unit 712 may be operable to carry out more or less operations to implement the proposed methods according to the exemplary embodiments of the present disclosure. In an embodiment, the apparatus 710 may comprise a transmitting unit (not shown in FIG. 7A) for transmitting various kinds of information from the apparatus 710 to other devices (e.g., a vehicle device, an RSU, a server, etc.).

Figure 7B:
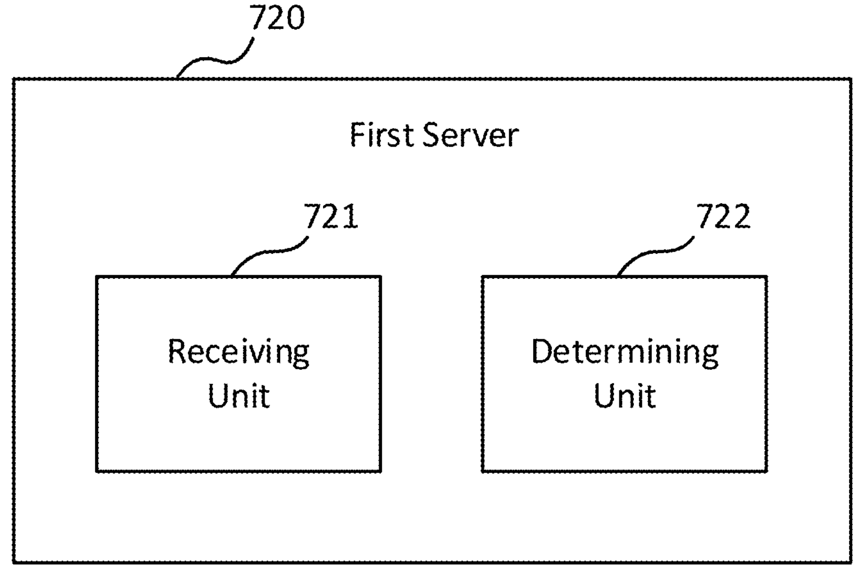

FIG. 7B is a block diagram illustrating an apparatus 720 according to some embodiments of the present disclosure. As shown in FIG. 7B, the apparatus 720 may comprise a receiving unit 721 and a determining unit 722. In an exemplary embodiment, the apparatus 720 may be implemented in a first server. The receiving unit 721 may be operable to carry out the operation in block 522, and the determining unit 722 may be operable to carry out the operation in block 524. Optionally, the receiving unit 721 and/or the determining unit 722 may be operable to carry out more or less operations to implement the proposed methods according to the exemplary embodiments of the present disclosure. In an embodiment, the apparatus 720 may comprise a transmitting unit (not shown in FIG. 7B) for transmitting various kinds of information from the apparatus 720 to other devices (e.g., a vehicle device, an RSU, a server, etc.).

Figure 7C:
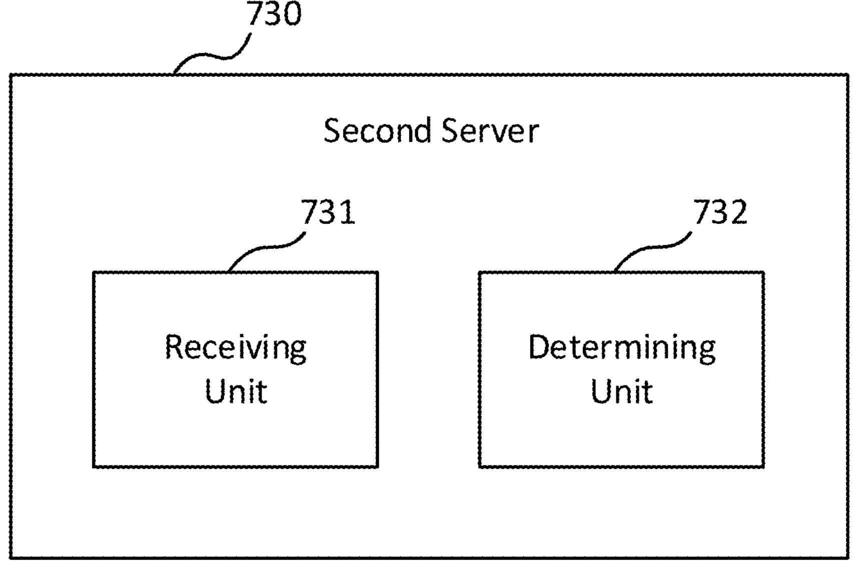

FIG. 7C is a block diagram illustrating an apparatus 730 according to some embodiments of the present disclosure. As shown in FIG. 7C, the apparatus 730 may comprise a receiving unit 731 and a determining unit 732. In an exemplary embodiment, the apparatus 730 may be implemented in a second server. The receiving unit 731 may be operable to carry out the operation in block 532, and the determining unit 732 may be operable to carry out the operation in block 534. Optionally, the receiving unit 731 and/or the determining unit 732 may be operable to carry out more or less operations to implement the proposed methods according to the exemplary embodiments of the present disclosure. In an embodiment, the apparatus 730 may comprise a transmitting unit (not shown in FIG. 7C) for transmitting various kinds of information from the apparatus 730 to other devices (e.g., a vehicle device, an RSU, a server, etc.).

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a vehicle device in an autonomous driving mode, comprising:
   receiving a traffic risk index from a first server, wherein the traffic risk index indicates a traffic risk based on vehicle-to-everything, V2X, message data;
   determining whether to perform one or more actions, according to the traffic risk index, wherein the one or more actions include, if the traffic risk index is above a threshold:
      switching driving modes from the autonomous driving mode to a manual driving mode if the autonomous driving mode corresponds to a first autonomous driving level range; and
      remaining in the autonomous driving mode while changing a driving strategy if the autonomous driving mode corresponds to a second autonomous driving level range at a higher level of automation than the first autonomous driving level range; and
   performing the determined one or more actions.

2. The method according to claim 1, wherein the one or more actions further include, if the traffic risk index is above the threshold:
   adjusting route planning if the autonomous driving mode corresponds to the second autonomous driving level range;
   and
   alerting if the autonomous driving mode corresponds to the first autonomous driving level range,
   wherein the first autonomous driving level range comprises autonomous driving levels 1, 2, and 3, and wherein the second autonomous driving level range comprises autonomous driving levels 4 and 5.

3. The method according to claim 1, wherein when the traffic risk index is within a predetermined range, the vehicle device determines to perform at least one of the one or more actions corresponding to the predetermined range.

4. The method according to claim 1, wherein the determination of whether to perform the one or more actions is also according to traffic data monitored by the vehicle device.

5. The method according to claim 1, wherein the vehicle device receives the traffic risk index from the first server periodically and/or on demand.

6. The method according to claim 1, further comprising:
   transmitting a request for the traffic risk index to the first server.

7. The method according to claim 6, wherein the request for the traffic risk index includes:
   a list of objects;
   one or more region identifiers, IDs, associated with the list of objects; and
   estimated time of arrival, ETA, corresponding to one or more region IDs.

8. The method according to claim 1, wherein the traffic risk index is associated with:
   a region; and
   a time period or a time instant.

9. The method according to claim 1, wherein the V2X message data is extracted from one or more V2X message reports of one or more devices, and wherein the one or more V2X message reports include information about one or more V2X messages which are exchanged between the one or more devices and one or more other devices.

10. The method according to claim 9, wherein the one or more devices include one or more of:
   one or more vehicle devices;
   one or more road side units; and
   one or more traffic control entities.

11. The method according to claim 1, further comprising:
   transmitting a V2X message report to a second server, wherein the V2X message report includes information about one or more V2X messages which are exchanged between the vehicle device and one or more other devices.

12. The method according to claim 11, wherein the one or more V2X messages include one or more vehicle-to-vehicle, V2V, messages and/or one or more vehicle-to-infrastructure, V2I, messages.

13. The method according to claim 11, wherein the vehicle device transmits the V2X message report to the second server periodically and/or on demand.

14. The method according to claim 11, wherein the first server is a central application server, and the second server is an edge application server.

15. The method according to claim 1, further comprising:
   transmitting a V2X message report to the first server, wherein the V2X message report includes information about one or more V2X messages which are exchanged between the vehicle device and one or more other devices,
   wherein the first server is implemented as an application server.

16. A non-transitory computer-readable medium having computer program codes embodied thereon which, when executed on a computer, cause the computer to perform the method according to claim 1.

17. A vehicle device in an autonomous driving mode, comprising:
   one or more processors; and
   one or more memories comprising computer program codes,
   the one or more memories and the computer program codes configured to, with the one or more processors, cause the vehicle device at least to:
   receive a traffic risk index from a first server, wherein the traffic risk index indicates a traffic risk based on vehicle-to-everything, V2X, message data;
   determine whether to perform one or more actions, according to the traffic risk index, wherein the one or more actions include, if the traffic risk index is above a threshold:
      switching driving modes from the autonomous driving mode to a manual driving mode if the autonomous driving mode corresponds to a first autonomous driving level range; and
      remaining in the autonomous driving mode while changing a driving strategy if the autonomous driving mode corresponds to a second autonomous driving level range at a higher level of automation than the first autonomous driving level range; and
   perform the determined one or more actions.

* * * * *